July 23, 1935.  J. J. SLOYAN  2,008,842
REGULATOR
Filed May 20, 1932
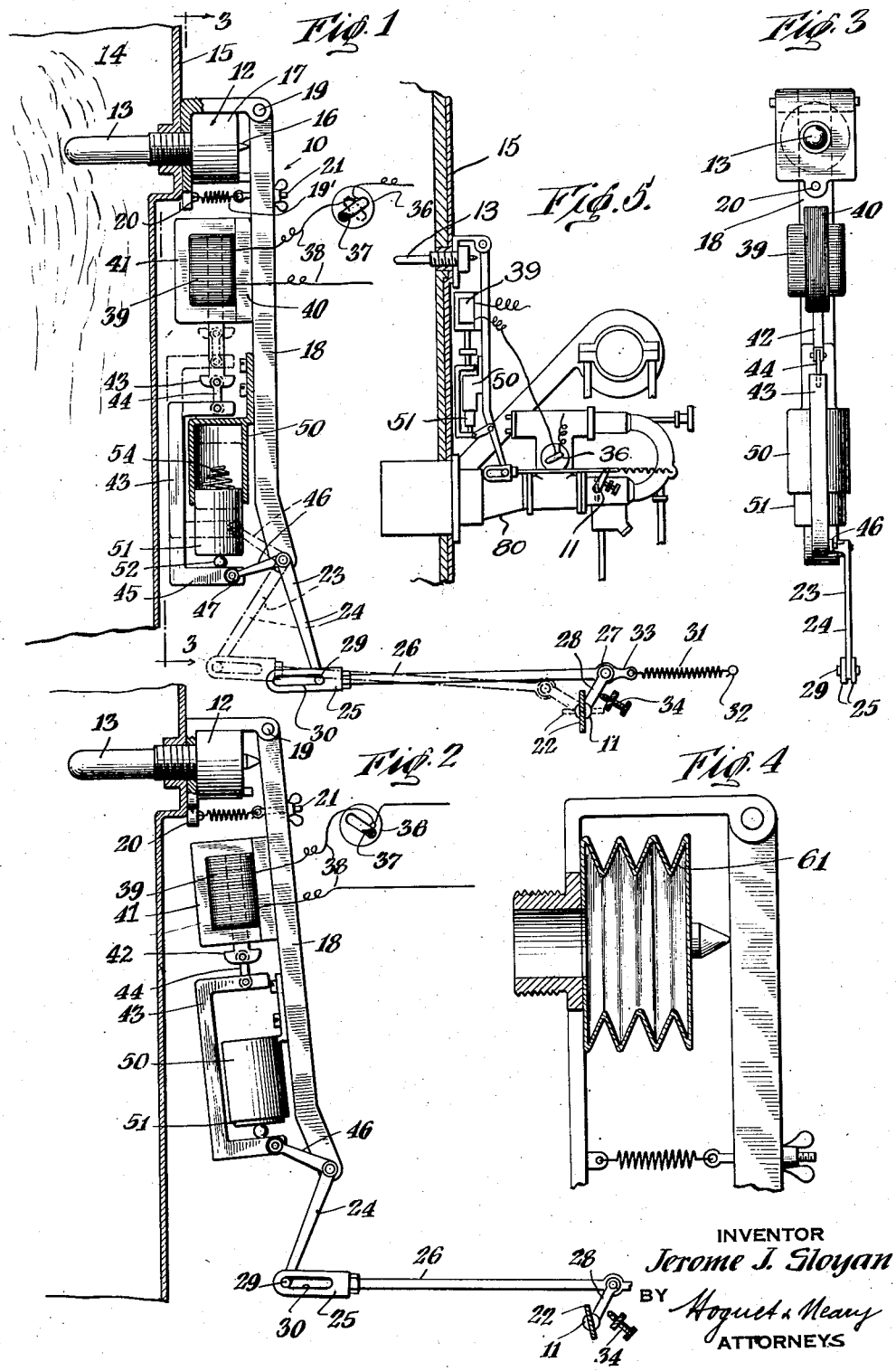
INVENTOR
Jerome J. Sloyan
BY
Hoguet & Neary
ATTORNEYS Patented July 23, 1935

2,008,842

UNITED STATES PATENT OFFICE 2,008,842

REGULATOR

Jerome J. Sloyan, Red Bank, N. J.

Application May 20, 1932, Serial No. 612,511

3 Claims. (Cl. 236—1)

This invention pertains generally to the class of regulators adapted to control valves, dampers, and the like. Regulators of this class as a general rule respond to changes in pressure, temperature, speed, or the like, and in turn control a valve, damper, rheostat or other member, the movement of which controls either directly or through an intermediate medium said pressure, temperature, speed, or the like as the case may be. Consequently, a correlation is obtained between the position of the valve, damper, rheostat or other member and the demands of the substance to which the regulator responds.

Heretofore, as far as I am aware, it has been customary to permanently attach a movable part of the regulator to the valve, damper, or other member, hereinafter referred to for convenience as the controlling member. It is found, however, that many devices, for instance, automatic controls for heat generators such as disclosed in my copending applications Serial No. 502,055 filed December 13, 1930 and Serial No. 620,593 filed July 2, 1932, prefer a structure by means of which the regulator and the controlling member may be automatically connected and disconnected without the need of any manual manipulations.

An example of such requirement exists in the case of oil burners. It is customary in oil burner construction, particularly when fuels of low volatility are consumed, to permit the burner to operate substantially at its minimum capacity until the parts have become sufficiently warm. If the controlling member, which may be in this case a butterfly valve, were permanently connected to the regulator, and the regulator were permitted to operate, the oil burner would be required to start at substantially maximum capacity because the temperature of the medium to be heated is generally so low at starting that the regulator would normally hold the controlling member wide open.

It is quite obvious, therefore, that the controlling member is necessarily either disconnected from the regulator or rendered substantially unmovable along with the regulator during the time that the oil burner is warming up, and should not be rendered operative until the burner is in condition to operate at substantially maximum capacity.

Connection and disconnection between the controlling member and the regulator must, of course, be made manually unless automatic means controlled by the temperature at some more or less definite point or points of the oil burner itself is provided for effecting the connection and disconnection at the proper temperature of the oil burner.

The invention herein consists of a regulator of such character.

Referring to the drawing in which like reference characters are appended to like parts in the various views;

Fig. 1 is an elevation of my regulator in cold position;

Fig. 2 is an elevation of the regulator in a warm position;

Fig. 3 is an end view; and

Fig. 4 is a broken elevation of a modification.

Figure 5 is a view similar to Figure 1 showing the burner and the regulator.

Referring more particularly to the drawing, at 10 is shown my regulator connected to an arm 28 secured to a shaft 11 upon which is mounted a butterfly valve 22 of a carburetor (not shown).

The regulator is shown with a temperature responsive member 12 of any approved construction having a bulb 13 shown inserted in a medium illustrated generally at 14 within an enclosure 15 as shown in Fig. 1 or the enclosure 15 may consist of two layers of material as shown in Fig. 5, if desired. Changes in temperature at the bulb 13 cause a member 16 of temperature responsive member 12 to advance and recede from the base 17 of member 12, advancing with increase in temperature and receding with decrease in temperature.

Arm 18 hinged at 19 is contacted by the member 16 and is caused to move counterclockwise as seen in Figs. 1 and 2 with the advance of member 16 upon increase in temperature at the bulb 13. Upon decrease in temperature at the bulb 13, arm 18 is caused to move clockwise with the recession of the member 16 by virtue of a spring 19' having one end secured at 20 and the other end attached to arm 18 by any means such as the eye-bolt and wing-nut illustrated at 21.

It is, of course, obvious that the degree of response of the arm 18 to the temperature responsive member 12 may be regulated generally by the strength of spring 19', and more accurately by adjustment of tension effected by the eye-bolt and wing-nut shown at 21.

Hinged at the movable end of arm 18 is a bell crank 23 having an arm 24 fitting between the arms of a U-shaped member 25 secured to a rod 26 which in turn is hinged at 27 to arm 28 secured to shaft 11. Arm 24 has a pin 29 extending through opposite faces thereof and fitting in and adapted to slide in slots 30 in the arms of U-shaped member 25.

A spring 31 having one end fixed at 32 is connected to arm 28, for instance by a link 33, the spring 31 being under tension and tending to hold arm 28 against adjustable stop 34 which may be mounted on the carburetor not shown. Preferably, spring 31 will be of considerably lesser strength than spring 19' and its strength generally will be not much greater than is reasonably required to perform the function of moving arm 28 clockwise toward stop 34 when rod 26 is free to move to the right as shown in Figs. 1 and 2.

With the parts above described, it is quite obvious that increase in temperature and resultant movement of arm 18 will not move arm 28 counterclockwise to open the butterfly valve 22 of the carburetor because bell crank 23 is free to swing about its hinge connection to arm 18. The butterfly valve 22 is, therefore, disconnected from the regulator 10.

To connect the butterfly valve 22 to the regulator 10, it is necessary to move the bell crank 23 to the dotted line position as shown in Fig. 1 which in turn not only moves pin 29 to the other end of slot 30, but also moves rod 26 and arm 28 to the dotted line position which in turn fully opens butterfly valve 22. As shown in Fig. 1, arm 18 is in cold position.

Bell crank 23 could, of course, be moved to the dotted line position manually and be secured in position by any desirable locking device. However, I prefer to employ automatic mechanism controlled by the temperature of the burner 80 or by any other suitable means as the case may be to move bell crank 23 from its full line position to its dotted line position in Fig. 1 and vice versa, or in other words, in the case illustrated, to connect and disconnect the butterfly valve 22 to and from the regulator 10.

For this purpose, I mount on the burner 80, at any convenient point at which the temperature is indicative of the temperature of the burner, a thermostat 36 shown with a mercury switch 37 in cold position in full lines in Fig. 1 and in warm position in dotted lines in Fig. 1 and in full lines in Fig. 2. The circuit 38 which is opened and closed by the thermostat 36 includes the winding of a solenoid 39 mounted on arm 18 as shown at 40. Solenoid 39 may be of any suitable construction, the one illustrated having external U-shaped laminations 41 and a movable core 42.

Movable core 42 is shown connected to a U-shaped member 43 by means of a link 44. The lower end 45 of U-shaped member 43 is attached to arm 46 of bell crank 23 through the medium of a cap screw 47 threaded in U-shaped member 43.

The operation of the parts above described is as follows:

Assuming that the burner is below the temperature required for continuous operation, thermostat 36 and bell crank 23 will be in their full line positions in Fig. 1 and no current will flow in circuit 38. Butterfly valve 22 is in position of minimum fuel mixture flow. Let it be assumed that the burner has been lighted and is warming up. After the burner has warmed up to the point where it is safe to fully open the butterfly valve 22, thermostat 36 will turn clockwise to the dotted line position shown in Fig. 1, closing the circuit 38, energizing the solenoid 39, drawing core 42 up into the solenoid, thereby moving U-shaped member 43, bell crank 23, rod 26, arm 28 and butterfly valve 22 to their dotted line positions shown in Fig. 1.

The valve is now wide open, it being assumed that the medium 14 is not at a temperature sufficiently high to move arm 18 from the position shown in Fig. 1. However, the operation is similar regardless of the position of arm 18, butterfly valve 22 being opened to the extent permitted by the position of arm 18.

As the medium 14 heats up, member 16 begins to advance outwardly from member 12 causing arm 18 to move counterclockwise, thereby effecting a closing movement of the butterfly 22.

During continuous operation of the burner butterfly 22 will be between its maximum and minimum positions depending upon the requirements of the medium 14 as to heat.

An intermediate position of the regulator is shown in full lines in Fig. 2.

In the type of solenoid illustrated, to present overheating, it is generally necessary for the top end of movable core 42 to touch the upper arm of U-shaped laminations 41 when 38 is closed. The invention, however, is not limited to any type of solenoid and, in fact, any other means may be substituted for the solenoid 39 such as a piston and cylinder operated by air pressure, etc.

With the number of parts and the operation so far described the oil burner would be required to change from minimum operation to maximum operation instantaneously. I find that it is desirable to have the butterfly 22 open gradually when the regulator is brought from a disconnected to a connected position.

To effect such gradual opening or, in other words, to effect a gradual connection of the regulator to the butterfly 22, I provide a dash pot arrangement illustrated as comprising a cylinder 50 secured to arm 18 in inverted position and a piston 51 resting upon the lower arm 45 of U-shaped member 43. A ball 52 secured to arm 45 might be interposed between arm 45 and piston 51, if desired, for refinement in operation. Piston 51 fits more or less loosely in cylinder 50 depending upon the extent of delayed action desired, the air in the cylinder escaping around the outside of the piston as the piston moves upwardly into the cylinder in response to the upward movement of U-shaped member 43 when circuit 38 is closed.

Inasmuch as the air in cylinder 50 is not under compression at the time the piston 51 moves upwardly, the first movement of piston 51 will be more or less rapid until sufficient compression is established in cylinder 50 to substantially counteract the force of solenoid 39. If rod 26 should follow this movement of piston 51, butterfly 22 would be opened rapidly at first. To prevent this initial rapid opening, slot 30 is provided so that up to the time that a substantial compression is effected in cylinder 50 by piston 51, pin 29 merely moves from one end of slot 30 to the other.

While the invention and its operation have been described with the regulator in cold position, it is, of course, understood that the operation would be in all respects similar for any other position, the only difference being the extent to which the butterfly 22 is opened.

If, during the operation of the burner, the flame becomes extinguished for any reason, the burner will, of course, cool down and eventually thermostat 36 will turn to its full line position as shown in Fig. 1, whereupon solenoid 39 will be de-energized, bell crank 23 will be released and spring 31 will bring butterfly 22 to its position of minimum opening. The effect would be substantially that of shutting down the burner. This action would take place regardless of the temperature of the medium 14 or the position of the arm 18.

If, now, ignition should be re-established automatically or otherwise, when the burner becomes sufficiently warm to turn thermostat 36 to its dotted line position in Fig. 1, the regulator would be again automatically connected to the butterfly 22. These results also would be accomplished regardless of the temperature of the medium 14 or the position of the arm 18.

It can, therefore, be seen that connection and disconnection of the regulator and the butterfly 22 are accomplished solely by means of the thermostat 36 regardless of the positions of the parts.

In order that piston 51 will not adhere to the top of cylinder 50, I may provide a compression spring 54 at the top of piston 51 as shown.

Having described my invention, it is obvious that any other means might be substituted for the temperature responsive member 12. For instance, this might be a pressure responsive member or a member responsive to the velocity of any medium, whether gaseous, liquid or solid. The controlling member would be chosen accordingly.

A pressure responsive member for moving arm 18 is illustrated at 61 in Fig. 4.

While the rod 26 has been described as controlling the butterfly valve of an oil burner, it might be connected to any other device for controlling any character of flame, or other heating means such as steam, hot water, etc., or any other means adapted to change the state of the medium to which the device 12 or its equivalent is responsive.

The particular description herein is merely for the purpose of illustration. Substitutions for the parts specifically described may be made without departing from the spirit of the invention.

The invention herein is not to be considered to be in any way limited to the particular use or uses described and the claims are intended to be limited only by the prior art.

I claim:
1. In combination, a medium, means responsive to the state of said medium, means for changing the state of said medium, means for varying the effect of said second mentioned means on said medium, means for operatively connecting said medium responsive means to said varying means to adapt said medium responsive means to automatically vary the effect of said second mentioned means on said medium according to the state of said medium, means responsive to a predetermined condition of said second mentioned means for controlling said connecting means, and means for causing changes in said varying means to be made gradually substantially throughout the step of connecting said varying means to said medium responsive means.

2. A regulator responsive to changes in state of a medium, a burner adapted to change the state of said medium, a controlling member adapted to control the combustion rate of said burner, means actuated by a predetermined temperature condition of said burner for automatically connecting and disconnecting said regulator to and from said controlling member, and means for causing changes in position of said controlling member to take place gradually substantially throughout connection of said controlling member to said regulator and to take place quickly during disconnection of said controlling member from said regulator.

3. In combination, a medium, means responsive to the state of said medium, means for changing the state of said medium, means for varying the effect of said second mentioned means on said medium, means for operatively connecting said medium responsive means to said varying means to adapt said medium responsive means to automatically vary the effect of said second mentioned means on said medium according to the state of said medium, means responsive to a predetermined condition of said second mentioned means for controlling said connecting means.

JEROME J. SLOYAN.